US007246423B1

(12) United States Patent
Holden et al.

(10) Patent No.: US 7,246,423 B1
(45) Date of Patent: Jul. 24, 2007

(54) SYSTEM AND METHOD FOR IN-LINE PRODUCTION OF INSULATED GLASS UNITS FOR CUSTOM WINDOWS

(75) Inventors: Randall Holden, Salem, WV (US); Brian Stewart, Pennsboro, WV (US)

(73) Assignee: Simonton Building Products, Inc., Parkersburg, WV (US)

( * ) Notice: Subject to any disclaimer, the term of this patent is extended or adjusted under 35 U.S.C. 154(b) by 320 days.

(21) Appl. No.: 10/738,019

(22) Filed: Dec. 17, 2003

Related U.S. Application Data

(60) Provisional application No. 60/435,176, filed on Dec. 19, 2002.

(51) Int. Cl.
*B23P 11/00* (2006.01)
*G06F 19/00* (2006.01)
*E06B 3/00* (2006.01)

(52) U.S. Cl. ............................ 29/430; 29/429; 29/822; 29/411; 29/412; 29/417; 700/100; 700/157; 700/115

(58) Field of Classification Search .................. 29/429, 29/430, 822, 411, 412, 417; 700/95, 97, 700/100, 115, 116, 117, 157, 180; 156/109; 428/34
See application file for complete search history.

(56) References Cited

U.S. PATENT DOCUMENTS 3,147,104 A * 9/1964 Dunipace et al. ............. 65/349
3,281,298 A * 10/1966 Stroud ........................ 156/109
4,837,449 A * 6/1989 Maltby, Jr. ............. 250/559.11
5,567,258 A * 10/1996 Lee et al. ................... 156/109
5,570,292 A * 10/1996 Abraham et al. ........... 700/157
6,068,720 A * 5/2000 McHugh ..................... 156/109
6,381,509 B1 * 4/2002 Thiel et al. ................. 700/115
6,630,028 B2 * 10/2003 Briese et al. ............... 118/683
6,742,285 B2 * 6/2004 Shepard ....................... 34/611
6,879,873 B2 * 4/2005 Passant ....................... 700/171
6,898,833 B2 * 5/2005 Ashton ....................... 29/33 P
7,089,071 B2 * 8/2006 Lilly et al. .................. 700/100
7,167,767 B2 * 1/2007 Clayton et al. ............. 700/100
7,206,656 B2 * 4/2007 Clayton et al. ............. 700/157
2003/0047538 A1 * 3/2003 Trpkovski .................... 216/84
2004/0236458 A1 * 11/2004 Clayton et al. ............. 700/171
2005/0012926 A1 * 1/2005 Trpkovski ................... 356/319
2005/0043838 A1 * 2/2005 Clayton et al. ............. 700/100
2005/0136198 A1 * 6/2005 Bourlier et al. ............... 428/34
2005/0182506 A1 * 8/2005 Passant ....................... 700/100

FOREIGN PATENT DOCUMENTS

DE 3709722 A * 10/1988

* cited by examiner

*Primary Examiner*—Essama Omgba
(74) *Attorney, Agent, or Firm*—Shannen C. Delaney; Cesari and McKenna, LLP

(57) ABSTRACT

A system and a method for in-line production of insulated glass units (IGU) for custom windows. The system and method schedule IGU production based on the order in which the cut glass is available, or broken out, from a glass cutting station. Once the IGUs are assembled, they are then sorted into the order in which they are to be further processed, i.e., into the order in which the corresponding windows are to be produced and shipped. Thus, the sorting, or carting, step occurs after the cut glass is contained in sealed IGUs, and the workers who perform the sorting step do not have to directly handle the pieces of cut glass.

13 Claims, 1 Drawing Sheet

SYSTEM AND METHOD FOR IN-LINE PRODUCTION OF INSULATED GLASS UNITS FOR CUSTOM WINDOWS

CROSS-REFERENCE TO RELATED APPLICATION

The present application claims the benefit of U.S. Provisional Patent Application Ser. No. 60/435,176, which was filed on Dec. 19, 2002, by Randall Holden et al., for a System and Method for In-Line Production of Insulated Glass Units for Custom Windows and is hereby incorporated by reference.

BACKGROUND OF THE INVENTION

1. Field of the Invention

The invention relates generally to the production of insulated glass units ("IGUs") for windows and, in particular, to the production of IGUs for custom windows.

2. Background Information

Known prior production systems for insulated glass units ("IGUs") for custom windows include a number of stages or stations, for example, a glass cutting station, a glass washing station, one or more assembly stations in which spacers are matched to the glass, and as a final stage a heated roller press station. Typically, the IGU production run is scheduled each day, based on the various customer orders and the associated shipping requirements, and also on the thickness of glass that is being cut on a given day. The IGUs are scheduled in batches, and within each batch the respective IGUs are produced in the same order in which the finished windows will ultimately be shipped or bundled for delivery.

When the IGUs are completed, they are then sent to the various other production processes, such as a vinyl fabrication process and a glazing process, which similarly take up the IGUs in the order in which the corresponding windows ship. Accordingly, at the end of the final process, the respective windows can be readily packed for shipping as the windows are completed. The windows thus do not require further sorting or storing and/or the associated extra handling. The potential for damage to the completed windows and the need for storage space for the custom-order windows is therefore minimized.

To produce the IGUs, an insulated glass sheet is cut into appropriately sized pieces, with matching pieces cut for each of the respective IGUs. The glass sheet is typically cut in a manner that optimizes the use of the glass. After cutting, the pieces are broken out of the sheet and the cut glass pieces for a given IGU are grouped together and the groups are then sorted into the production order. To sort the cut glass, the workers place the pieces for a given IGU in a designated slot of a particular production, or harp, cart. Each harp cart holds the cut glass for approximately 100 IGUs, and each batch of cut glass corresponds to approximately 400 IGUs, or the contents of four carts. If the cut glass breaks or is otherwise damaged during the breakout, sorting or carting steps, repair glass is cut and placed in the appropriate cart/slot. Once the carts are filled, the carts are moved to the washer station, and the cut glass pieces are removed from the carts and sent through the washer in the sorted order.

After washing, the glass is provided to the assembly stations where spacers are matched to and combined with the glass. At the assembly station the spacers are arranged on a first of the cut glass pieces and the second piece of cut glass is then placed on top of the spacers, such that the spacers are sandwiched between the two pieces of cut glass. The glass "sandwiches" are then sealed at a next station by heating and pressing. Thereafter, the assembled IGUs are labeled and returned to the carts, still in the sorted order, and the carts then transport the IGUs to the fabrication and/or glazing processes.

The end result of the production method described above is that the IGUs, and ultimately the finished windows, are made in an order that corresponds to how the windows must be arranged for shipment. The windows can thus be readily moved off of the production line to trucks or containers for shipping, as discussed above.

One of the disadvantages of the production method is that the steps of carting and un-carting the cut glass have the potential for scratching or breaking the glass. In particular, when the two cut pieces of glass are grouped, the two pieces may scratch one another. Also, when the two pieces are placed on end in the cart, the pieces may scratch as they ride against each other and/or the pieces may break at the corners or along the ends on which they rest in the cart. Further, when the glass is pulled out of the cart for washing, there is again the risk of scratching and/or breaking. Also, when low-E glass is used, the carting and un-carting of the glass may introduce smudges and/or fingerprints that are not easily removed. Additionally, the carting and un-carting steps involve a risk of cuts or other injuries to the workers who handle the glass and/or maneuver the heavy carts.

Another disadvantage is that the various stations tend to operate at different paces, in the sense that the cutting, breaking out and sorting process takes longer than the respective washing and assembly processes. After the cutting and sorting process, the glass for approximately 400 windows essentially arrives by cart at the washing station at one time. The glass is then relatively quickly removed from the carts and serially fed into the washer. The washed glass is then provided directly to the spacer assembly station at a is relatively rapid rate. The assemblers must work quickly to assemble the glass and spacers, to keep pace with the arrival of the washed glass. After the batch of IGUs are assembled, the assemblers are then idle until a next batch arrives at the washer. The intermittent and rapid pace of the assembly work tends to increase the potential for repetitive motion injuries.

SUMMARY OF THE INVENTION

The invention is a system and a method for in-line production of IGUs for custom windows. The system and method schedule IGU production based on the order in which the cut glass is available, or broken out, from the glass cutting station. Once the IGUs are assembled, they are then sorted into the order in which they are to be further processed, i.e., into the order in which the corresponding windows are to be produced and shipped. Thus, the sorting, or carting, step occurs after the cut glass is contained in sealed IGUs, and the workers who perform the sorting step do not have to directly handle the pieces of cut glass.

More specifically, the in-line IGU production system and method uses a conveyor mechanism to transport the cut glass directly from the glass cutting station to the glass washer. If a piece of glass is broken during, for example, the cutting or breakout process, the broken piece is removed from the conveyor system and a piece of tempered glass is used as a "placeholder" in the line. The placeholder then travels through the system, to maintain the relative order.

The cut and washed glass pieces are provided to the spacer assembly station, where the pieces are matched with spacers and the respective spacers are sandwiched between the corresponding two cut glass pieces. The assembled sandwiches are next sent through a heated roller press and emerge as sealed IGUs. The IGUs are then sorted into the order for shipping as the IGUs are carted for delivery to the fabrication and/or glazing areas.

The sorting step is simplified by attaching printed labels to the IGUs as the IGUs emerge from the heated roller press. The labels, which are printed in the same order in which the IGUs are produced, designate the carts and slots into which the respective IGUs are to be placed after sorting. The sorting step is thus a matter of placing each IGU in the cart/slot indicated on the associated label.

When a placeholder arrives at the spacer assembly station, a worker at the station retains the spacers for use with repair glass and provides to a worker at a repair station information that identifies the corresponding IGU. The placeholder then continues through the heated roller press, to maintain the relative order of the line. As the placeholder emerges from the heated roller press, the workers at the end of the IGU production line add the corresponding label to a repair list that is maintained in the same relative order.

Once the full line of IGUs and placeholders have passed through the IGU production line, the cut glass pieces from the repair station are brought to the assembly station, in the same order in which the repair information was provided to the repair station from the production line. The assembly workers then combine the repair cut glass with the corresponding spacers, which were retained at the spacer assembly station in the same relative order. Thereafter, the assemblies are passed through the heated roller press and emerge as sealed IGUs. The saved labels, which are also in the same order as the respective repairs, are then applied to the IGUs, and the IGUs are placed in the carts/slots that are indicated on the respective labels. The carts are then ready for transport to the fabrication and glazing areas, which process the IGUs in the sorted order.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
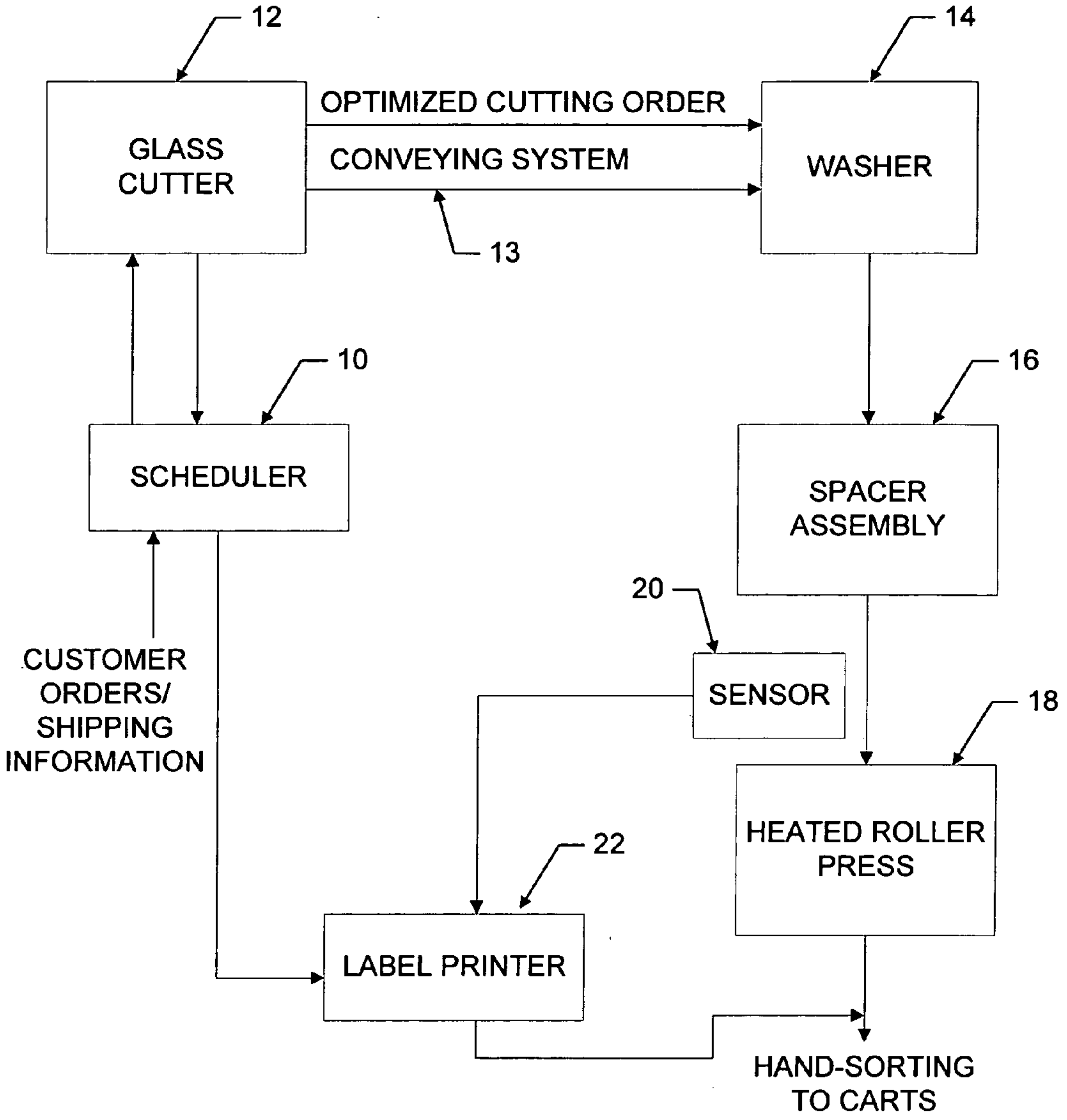
FIG. 1 is a functional block diagram of a system constructed in accordance with the invention.

Referring now to FIG. 1, a scheduler 10 operates in conjunction with the glass cutting station 12 to schedule the production of IGUs for a next batch of windows. The glass cutting station 12 operates in a known manner to optimize use of the glass, such that a maximum amount of each glass sheet is utilized. The glass cutter thus produces a cutting map for a given sheet and provides the map or related information to the scheduler. The scheduler then determines the breakout order of the pieces from the glass sheet and sets the order of IGU production accordingly.

The scheduler 10 also receives from, for example, a shipping department (not shown), information concerning the shipping order for the batch. The scheduler then determines the order in which the respective IGUs must be provided to associated fabrication and glazing areas. The scheduler provides a mapping of IGUs to carts/slots, i.e., a sorting map, to a label printer 22, which prints associated labels. The operations of the printer are discussed in more detail below.

The glass cutting station 12 includes a dual head cutting system that for each IGU simultaneously cuts both pieces of glass. One head cuts one piece and the second head cuts the mirror image. Thus, at breakout, both pieces of cut glass for a given IGU emerge from the cutting system at essentially the same time. Alternatively, the glass cutting system may use two cutting tables, each of which operates in synchronism to simultaneously cut two sheets of glass to produce the matched pieces.

After the sheets move under the cutter, the cut pieces are "broken" out of the sheet. The first pieces that break out are the ones that are closest to the end of the sheet that emerges first from the cutter. As discussed, the two pieces of cut glass for a given IGU break out at essentially the same time.

A conveying system 13 transports the matched pieces, in the order in which they break out, to a washer 14. Along the route of the conveying system, the cut glass is examined for damage, such as scratches, cracks and breaks. If a cut piece is damaged, the piece and its mate are removed, and they are replaced with a piece of tempered glass that serves as a "placeholder" and preserves the relative order of the IGU production.

The washed glass pieces are next provided to a spacer assembly station 16. At the spacer assembly station, the two pieces of cut glass are combined with appropriately sized spacers. The spacers are thus arranged on a first piece of the cut glass and the second piece is then placed on top of the spacers. The glass assembly is then provided to a heated roller press 18, which seals the cut glass into an IGU.

When a tempered glass piece, i.e., a placeholder, reaches the spacer assembly station 16, the assemblers notify a repair station that the glass for a particular IGU must be re-cut. The assemblers identify which unit requires repair by the relative position of the tempered glass piece in the IGU production line. The assemblers also retain the associated spacers in, for an example, a repair rack, and allow the tempered glass piece to proceed to the heated roller press. Each time a tempered glass piece reaches the spacer assembly station, the assemblers report the need for a repair to the repair station and the assemblers also retain the associated spacers in the repair rack. The repairs are thus reported and the spacers retained in the same order in which the corresponding IGUs would have been produced Before a cut glass assembly or a placeholder enters the heated roller press 18 the assembly or placeholder passes a sensor 20, which sends a corresponding signal to a label printer 22. Each time the label printer receives a signal, the printer prints a next label. If the label corresponds to a placeholder, the worker saves the label in a repair list. Otherwise, the worker attaches the label to the associated IGU, that is, to the IGU that next emerges from the heated roller press.

The printed labels include associated slot numbers and cart identifiers that correspond to the order in which the associated windows are to be produced, i.e., the order in which the windows will ship. Once a label has been attached to an IGU, the IGU is placed in the cart/slot that is identified on the label, and at the end of the batch, the respective IGUs are thus sorted in the order in which they are to be taken up in the fabrication and glazing areas.

If there are no repairs, the harp carts are then moved to the fabrication and/or glazing areas. If there are repairs, the harp carts remain in place until the repair IGUs are produced.

For the repairs, new glass is cut at the repair station in the order in which the repair pieces are reported from the IGU production line. The repair cut pieces are provided, in the same order, to the spacer assembly station 16. At the station, the cut glass is assembled with the reserved spacers, which are racked in the order in which the repairs were reported. The glass and spacer assemblies are next provided to the heated roller press 18. As each repair IGU emerges from the press, the next label on the repair list is attached to the IGU. The IGU is then placed in the cart/slot that is indicated on the label. Once all the repairs are run and the carts are loaded, the carts are moved to the fabrication or glazing areas.

There are several advantages to the in-line IGU production system and method over the known prior IGU production systems and methods. The main advantage is that the sorting step is done with IGUs instead of cut glass. Thus, the workers do not have to cart and un-cart the cut glass pieces. The workers are thus less prone to damage the glass and/or to cut themselves. In addition, the sorting step in the in-line production system and method relies on printed labels that designate the placement of the IGUs within the various harp carts. The old system relies on the workers consulting and following one or more printed or displayed schedules, which requires that the workers keep track of the progress of the glass breakout. Further, the workers must also keep track of damaged glass, in order to provide the appropriate information to the repair station during the sorting step.

Another advantage of the current system is that the cut glass is provided to the spacer assembly station at the rate at which the glass is broken out of the sheets. Thus, the assemblers work continuously and at a less rapid pace to assemble the batch of IGUs. The workers may thus be less prone to repetitive motion injuries.

The system described with reference to FIG. 1 is preferably used in conjunction with software that schedules the IGU production and keeps track of the IGUs in various stages of production. At each of the stations, a computer monitor or other display (not shown) shows a section of the schedule that includes the unit then in production and several units before and after the current unit. The workers can thus consult the display to double check the progress of the line, order repairs, and/or ensure that, for example, the appropriate spacers are ready for the next set of cut glass pieces, and so forth. As such, the workers do not need to manually keep track of where they are in the production schedule.

What is claimed is:

1. A method for implementing an in-line production process configured to assemble an insulated glass unit (IGU), the method comprising:

cutting first and second glass pieces from a glass sheet so as to optimize use of the glass sheet, the first and second glass pieces being designed for use in the IGU;

scheduling the relative position of the IGU in a sorted set of one or more IGUs;

inserting a spacer between the first and second glass pieces to form the IGU;

placing the IGU at its scheduled position in the sorted set of one or more IGU; and if the first glass piece or the second glass piece is damaged before the IGU is formed, performing the steps:

inserting the spacer in an ordered arrangement of spacers; and inserting an IGU identifier corresponding to the IGU in an ordered list of IGU identifiers.

2. The method of claim 1, wherein the IGU identifier stores information regarding the IGU's scheduled position in the sorted set of one or more IGUs.

3. The method of claim 1, further comprising:

re-cutting the first and second glass pieces;

retrieving the spacer from the ordered arrangement of spacers;

inserting the spacer between the re-cut first and second glass pieces to form the IGU;

retrieving the IGU identifier from the ordered list of IGU identifiers; and placing the IGU at a position in the sorted set of one or more IGUs determined by the contents of the retrieved IGU identifier.

4. The method of claim 1, wherein the IGU identifier indicates both a slot location and a cart identifier that together correspond to the relative position of the IGU in the sorted set of one or more IGUs.

5. A method for implementing an in-line production process configured to assemble an insulated glass unit (IGU), the method comprising:

cutting first and second glass pieces from a glass sheet so as to optimize use of the glass sheet, the first and second glass pieces being designed for use in the IGU;

removing the first and second glass pieces from the glass sheet and placing the first and second glass pieces on a conveyor system wherein a glass cutting station, a washing station, a spacer assembly station and a heated roller press are interconnected by the conveyor system;

scheduling the relative position of the IGU in a sorted set of one or more IGUs;

inserting a spacer between the first and second glass pieces to form the IGU; and placing the IGU at its scheduled position in the sorted set of one or more IGUs removing the first and second glass pieces from the conveyor system if either the first glass piece or the second glass piece is damaged before being received by the spacer assembly station; and replacing the removed first and second glass pieces with a placeholder on the conveyor system.

6. The method of claim 5, wherein the placeholder is a tempered glass piece.

7. The method of claim 5, further comprising:

generating the IGU identifier after the placeholder or the IGU exits the heated roller press.

8. The method of claim 7, wherein a sensor positioned along the conveyor system senses when the placeholder or the IGU exits the heated roller press.

9. A method for implementing an in-line production process configured to assemble an insulated glass unit (IGU), the method comprising:

(a) cutting first and second glass pieces used to form the IGU;

(b) generating a label identifying the relative position of the IGU in a sorted set of one or more IGUs; and (c) if either the first glass piece or the second glass piece is damaged during the in-line production process, performing the steps:

placing a spacer corresponding to the first and second glass pieces in an ordered arrangement of spacers; and placing the generated label in an ordered list of labels.

10. The method of claim 9, wherein step (c) further comprises the steps:

re-cutting the first and second glass pieces;

retrieving the spacer corresponding to the first and second glass pieces from the ordered arrangement of spacers;

placing the spacer between the re-cut first and second glass pieces to create a glass assembly;

sealing the glass assembly to form the IGU;

retrieving the label from the ordered list of labels; and placing the IGU in the sorted set of one or more IGUs at a location determined by the contents of the retrieved label.

11. The method of claim 9, further comprising:

if the first and second glass pieces are not damaged during the in-line production process, performing the steps:

placing the spacer corresponding to the first and second glass pieces between the first and second glass pieces to create a glass assembly;

sealing the glass assembly to form the IGU; and placing the IGU in the sorted set of one or more IGUs at a location determined by the contents of the generated label.

12. The method of claim 9, wherein a scheduler determines the relative position of the IGU in the sorted set of one or more IGUs.

13. The method of claim 9, wherein the generated label indicates both a slot location and a cart identifier that together correspond to the relative position of the IGU in the sorted set of one or more IGUs.

* * * * *